United States Patent
Wataya et al.

(10) Patent No.: US 6,275,306 B1
(45) Date of Patent: Aug. 14, 2001

(54) IMAGE PROCESSING SYSTEM CONVERTING THE PIXEL ASPECT RATIO

(75) Inventors: Masafumi Wataya, Kawasaki; Toshiyuki Yanaka, Tokyo; Yushi Kaneko; Yasutomo Suzuki, both of Yokohama, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 08/304,212

(22) Filed: Sep. 12, 1994

Related U.S. Application Data

(63) Continuation of application No. 07/592,991, filed on Oct. 4, 1990, now abandoned.

(30) Foreign Application Priority Data

| Oct. 4, 1989 | (JP) | 1-260709 |
| Oct. 3, 1990 | (JP) | 2-266861 |
| Oct. 3, 1990 | (JP) | 2-266862 |
| Oct. 3, 1990 | (JP) | 2-266863 |
| Oct. 3, 1990 | (JP) | 2-266864 |

(51) Int. Cl.$^7$ ..................... H04N 1/40
(52) U.S. Cl. .................. 358/445; 358/448; 348/441; 348/445
(58) Field of Search ................ 358/445, 401, 358/406, 444, 448, 449, 451, 909, 400; 348/441, 443, 445

(56) References Cited

U.S. PATENT DOCUMENTS

| 4,595,958 | * | 6/1986 | Anderson, Jr. et al. | 358/77 |
| 4,611,225 | * | 9/1986 | Powers | 358/140 |
| 4,651,223 | | 3/1987 | Sasaki et al. | 358/284 |
| 4,897,799 | * | 1/1990 | Le Gall et al. | 358/400 |
| 4,953,025 | * | 8/1990 | Saitoh et al. | 358/140 |
| 5,093,730 | * | 3/1992 | Ishii et al. | 358/451 |
| 5,159,438 | * | 10/1992 | Rabii | 348/445 |

FOREIGN PATENT DOCUMENTS

| 0148164 | 7/1985 | (EP) . |
| 0294622 | 12/1988 | (EP) . |
| 2543771 | 3/1984 | (FR) ................ H04N/1/40 |
| 2543771 | 10/1984 | (FR) . |
| 61-262383 | 4/1987 | (JP) . |
| 63-212281 | 1/1989 | (JP) . |
| 63-268651 | 2/1989 | (JP) . |
| 63-307955 | 4/1989 | (JP) . |

* cited by examiner

*Primary Examiner*—Thomas D. Lee
(74) *Attorney, Agent, or Firm*—Fitzpatrick, Cella, Harper & Scinto

(57) ABSTRACT

An image processing system having an input/output unit for inputting or outputting a video signal, and a scanner for reading an original image or a printer for printing the video signal, in which the aspect ratio of the image is converted at the input or output of the video signal between the input/output unit and the scanner or the printer.

31 Claims, 8 Drawing Sheets

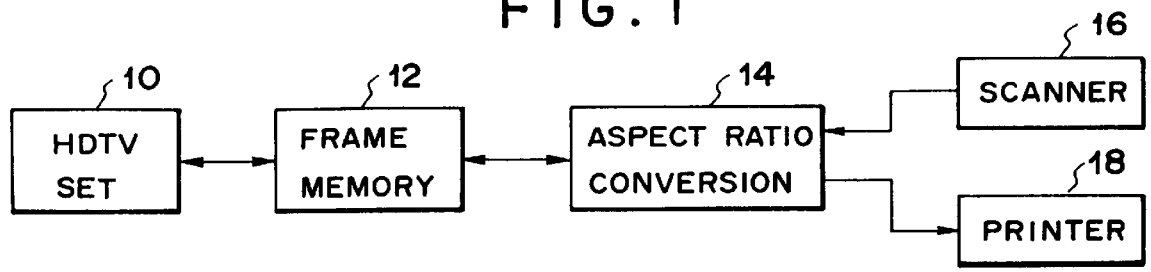
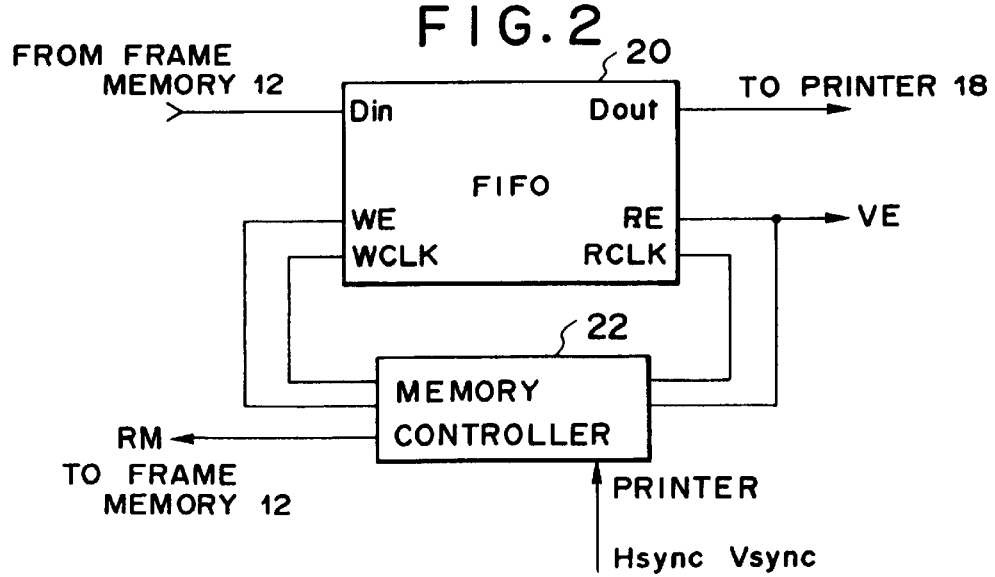

IMAGE PROCESSING SYSTEM CONVERTING THE PIXEL ASPECT RATIO

This application is a continuation of application Ser. No. 07/592,991 filed Oct. 4, 1990, now abandoned.

BACKGROUND OF THE INVENTION

1. Field of the Invention

The present invention relates to an image processing system, and more particularly to an image processing system for processing video signals.

2. Description of Related Art

Video printing is already known for printing a television image. Particularly the video printing from the conventional television system with 525 scanning lines is utilized as very useful means for printing decisive moments in news or sports programs.

In recent sports events or the like, video records are the often only available records, so that the role of video printing has become more and more important. Particularly the image of high definition television (HDTV) will significantly improve the image quality of video printing, and will evidently expand the application of the video printing. For example, high definition television has a resolving power of 1920×1035 points and can provide a high-quality image on a print up to A4 size.

However, in case of handling the image signal of the conventional high definition television in the form a digital signal, the vertical-to-horizontal ratio of each pixel is not 1:1 (square) but each pixel has a somewhat oblong rectangular shape which, for example, corresponds to the proposed standard of BTA (Broadcasting Technology Development Association). Consequently, if such data, in which the vertical-to-horizontal ratio of each pixel is not 1:1, are supplied to a printing apparatus or the like designed to process data with square pixels, a distorted image will result because the aspect ratio of the printed image is different from that of the original image.

Also similar image distortion will be encountered when a video signal of 1:1 aspect ratio, generated in an image reading unit such as a scanner, is supplied to a BTA-standard equipment such as a digital video cassette recorder.

Furthermore, the sampling frequency of 74.25 MHz employed in the high definition signal is primarily designed for use in the broadcasting studio. Since the amount of image data becomes enormous at such a sampling frequency, the frequency is generally reduced, in the usual professional and amateur appliances, to a level that can maintain tolerable image quality. For example, a sampling frequency of 48.6 MHz is employed in a so-called MUSE system. However each pixel is not square even at such a sampling frequency, such that the above-explained aspect ratio difficulty is still encountered.

SUMMARY OF THE INVENTION

An object of the present invention is to provide an image processing system without the drawbacks mentioned above.

Another object of the present invention is to provide an image processing system capable of providing a satisfactory image even if the aspect ratios of the printer and the image input apparatus are mutually different, that is, different relative to one another.

The foregoing objects can be attained, according to a preferred embodiment of the present invention, by an image processing system provided with input or output means for inputting or outputting a video signal, and a scanner for reading an original image or a printer for forming the image of the video signal, wherein the aspect ratio of the image is converted at the transfer of the video signal between said input or output means and said scanner or printer.

Still another object of the present invention is to provide an image processing system capable of providing a satisfactory image with a simple structure, even when the aspect ratios of the printer and the image input apparatus are mutually different.

Still another object of the present invention is to provide an image processing system capable of varying the aspect ratio of the image of the printer or the image input apparatus without the use of a particular device for converting the amount of data.

Still another object of the present invention is to provide an apparatus capable of satisfactorily printing an image signal matching the standard of high definition television.

Still other objects of the present invention, and the features thereof, will become fully apparent from the following description of several embodiments, which is to be taken in conjunction with the attached drawings.

BRIEF DESCRIPTION OF THE DRAWINGS

FIG. 1 is a block diagram of a first embodiment of the present invention;

FIG. 2 is a block diagram of an aspect ratio converter 14 shown in FIG. 1;

DETAILED DESCRIPTION OF THE PREFERRED EMBODIMENTS

Figure 3:
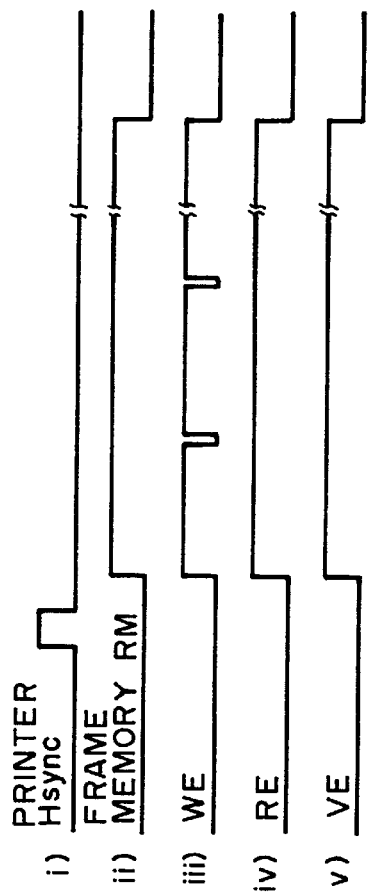
FIG. 3 is a timing chart showing the function of the circuit shown in FIG. 2.

FIG. 1 is a block diagram of an image processing system embodying the present invention. In FIG. 1 there are shown a high definition video equipment (hereinafter written as HD equipment) 10 for inputting or outputting video signal, such as a high definition television camera, a high definition video cassette recorder or a high definition television receiver; a frame memory 12 for storing the video signal from the HD equipment or from a data amount converter; a data amount converter (also referred to as an ratio converter) 14 for converting the amount of data of the video signal from the frame memory 12 or a scanner 16, and for supplying data to the frame memory 12 or to a printer 18; a scanner 16 and a printer 18 which may be connected by a signal cable to form a copying apparatus by the mutual combination.

In the present embodiment, the HD equipment 10 releases an image signal of a frequency of so-called BTA standard (ca. 74.25 MHz), and the printer 18 prints the image signal with a speed corresponding to 71.28 MHz.

In the following there will be explained two examples of the structure of the data amount converter 14.

When the high definition television signal is sampled with a frequency of 74.25 MHz, as defined in the BTA standard, each pixel is vertically oblong and each line contains 1920 pixels. On the other hand, the printer 18 forms square pixels with a vertical-to-horizontal ratio of 1:1, so that a line requires 1840 pixels in order to realize the aspect ratio 16:9 of the high definition television. Consequently, in order to print the video image sampled with 74.25 MHz, the data amount per scanning line has to be reduced from 1920 pixels to 1840 pixels.

For this purpose, either of following two methods may be employed in the present embodiment.

(1) Simple skipping method:

As explained above, the sampling frequency of the BTA standard and the frequency of the printer are different by about 3 MHz. Consequently the aspect ratio of the entire image can be retained by skipping 3 pixels per every 74 pixels.

(2) Calculation method:

Instead of skipping 3 pixels per every 74 pixels as mentioned above, an interpolating calculation can be employed to convert 74 pixels into 71 pixels, thereby obtaining a smooth image.

Now reference is made to FIG. 2 showing an example of the structure of the data amount converter 14 employing the simple skipping methods explained above.

A FIFO (first-in-first-out) memory 20 is provided for storing the data from the frame memory 12 and sending the data to the printer 18. The FIFO memory is an asynchronous memory for converting the data amount in each line, and can have a structure of 2048×8 bits, since there are 1920×1035 effective pixels in the BTA standard. A memory controller 22 receives a horizontal synchronization signal Hsync and a vertical synchronization signal Vsync from the printer 18, and generates, in synchronization with the Hsync signal, a read instruction signal RM to the frame memory, a write enable signal WE and a read enable signal RE to the FIFO memory 20, and a video enable signal VE indicating the effective image period to the printer.

In the following there will be explained the function of the data amount converter 14, with reference to a timing chart shown in FIG. 3, illustrating the Hsync signal (i) of the printer, the read instruction signal (ii) for the frame memory 12, the write and read enable signals (iii), (iv) for the FIFO memory 20, and the video enable signal VE (v) to the printer 18. The memory controller 22 shown in FIG. 2 sends write clock signal WCLK of 74.25 MHz and read clock signal RCLK of 71.28 MHz to the FIFO memory 20. Thus the FIFO memory 20 shown in FIG. 2 performs a compensation between the speed of the frame memory 12 according to the BTA standard, and 71.28 MHz of the printer 18.

Also in the present embodiment, the WE signal is maintained at the low level state for periods of 3 pixels in a period of 74 pixels as shown by (iii) in FIG. 3, thereby realizing the simple skipping explained in (1) above.

Figure 7:
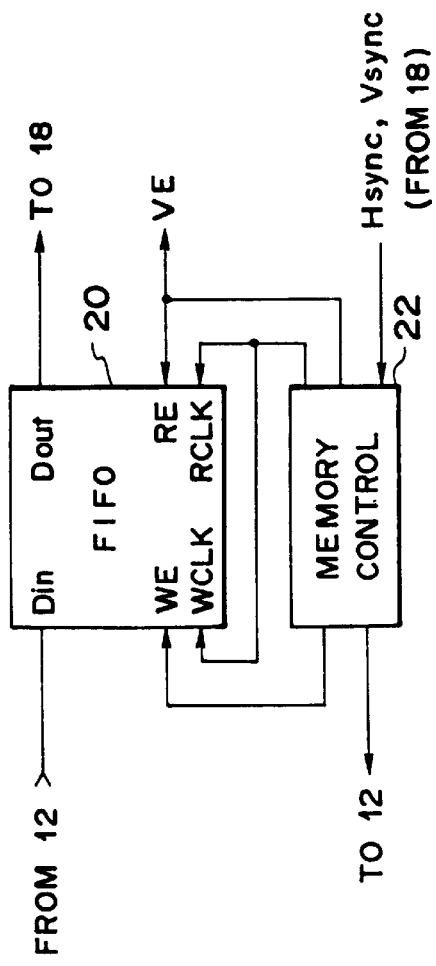
FIG. 7 is a block diagram of a variation of the circuit shown in FIG. 2.
Figure 8:
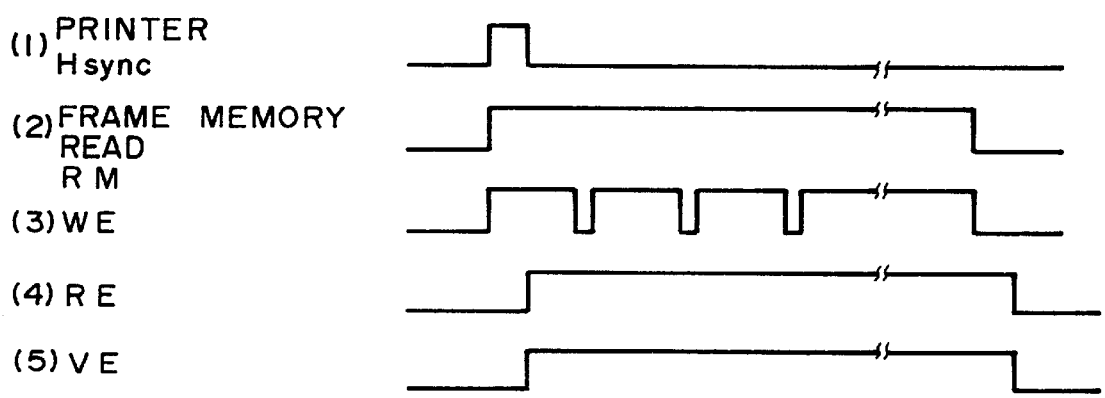
FIGS. 8 and 9 are timing charts showing the function of the circuit shown in FIG. 7.

It is also possible to use common clock pulses as the RCLK and WCLK signals as shown in FIG. 7, to read the image data from the frame memory 12 simultaneous with the entry of the horizontal synchronization signal Hsync from the printer 18 and to realize the pixel skipping by controlling the read enable signal for the memory 20. In this case, after the blanking period of the printer 18, the read enable signal RE is rendered effective to supply the pixel data, subjected to data amount conversion, from the memory 20 to the printer 18.

Figure 9:
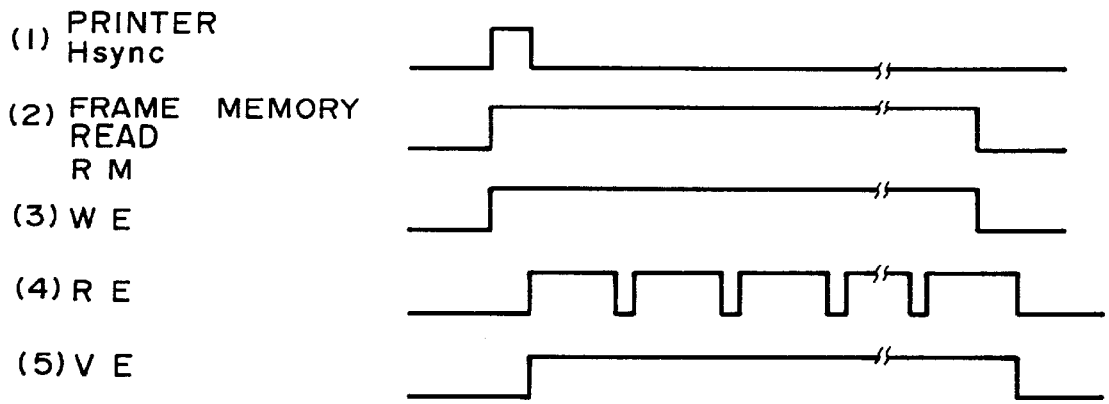

FIG. 9 is a timing chart of the memory 20 and the memory controller 22 in the case of printing the video data sampled at 48.6 MHz. In this case each pixel becomes horizontally oblong, and a line contains 1257 pixels. It is therefore necessary, for supplying data to the printer 18, to interpolate a pixel in every about 2.16 pixels. Such interpolation can be realized by controlling the data being read from the memory 20. However, since interpolation of a pixel is only possible per an integral number of pixels, there are combined, in the present embodiment, interpolation of a pixel per two pixels and interpolation of a pixel per three pixels to achieve interpolation of a pixel per every 2.16 pixels in average.

In the embodiment shown in FIG. 2, the conversion of the aspect ratio is conducted at the transfer of the video signal from the frame memory 12 to the printer 18. Another embodiment shown in FIG. 4 is capable of an additional conversion of the aspect ratio at the storage of the image signal, obtained in the scanner 16, in the frame memory 12.

Figure 4:
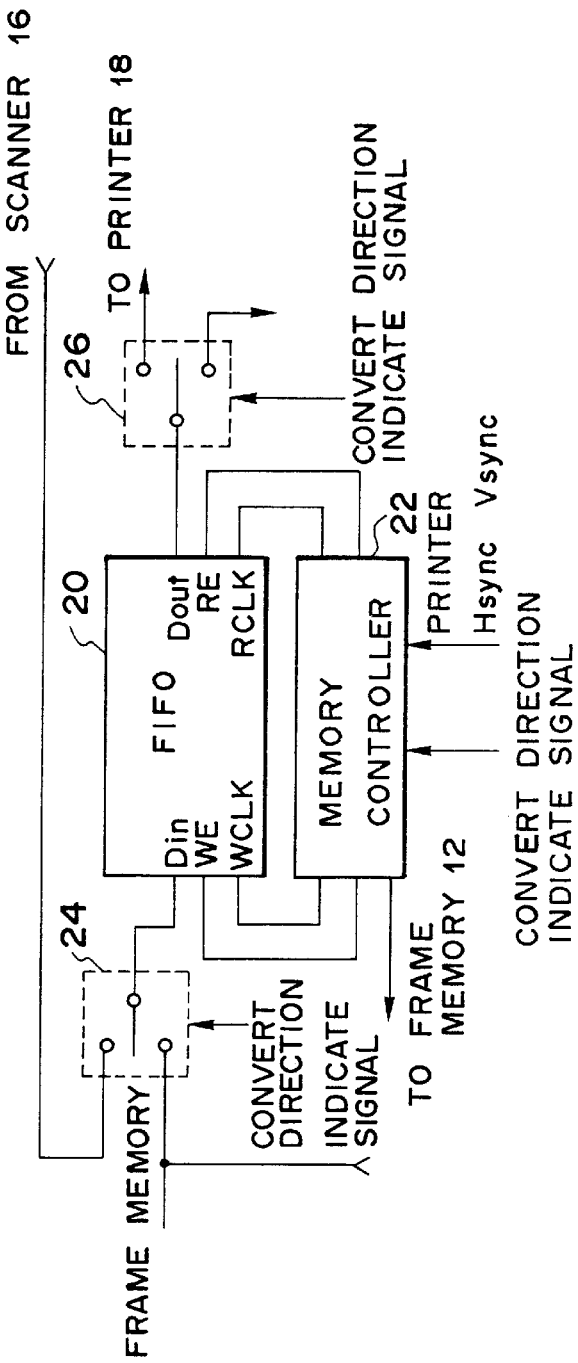
FIG. 4 is a block diagram showing another embodiment of the circuit shown in FIG. 2.

In the embodiment shown in FIG. 4, there are additionally provided switches 24, 26 for switching the input and output of the FIFO memory. 20. A switch instruction signal, for controlling the switches 24, 26, is also supplied to the memory controller 22. In response to the switch instruction signal, the memory controller 22 controls the signals WE, RE, WCLK, RCLK supplied to the FIFO memory 20 in such a manner as to effect an operation opposite to the pixel skipping explained above.

As explained in the foregoing, the present embodiment is capable of arbitrary conversion of the aspect ratio by using a FIFO memory and controlling the timing and frequency of data writing into and reading from the FIFO memory.

Also in the present embodiment, since the data amount converter 14 is provided behind the frame memory for storing the video signal obtained from the HD equipment, said data amount converter 14 can be operated at a relatively low speed, in comparison with the case in which the data amount converter is provided between the HD equipment and the frame memory, so that the circuit can be operated with improved precision.

In the following there will be explained the structure of the printer 18 of the present embodiment.

Figure 5:
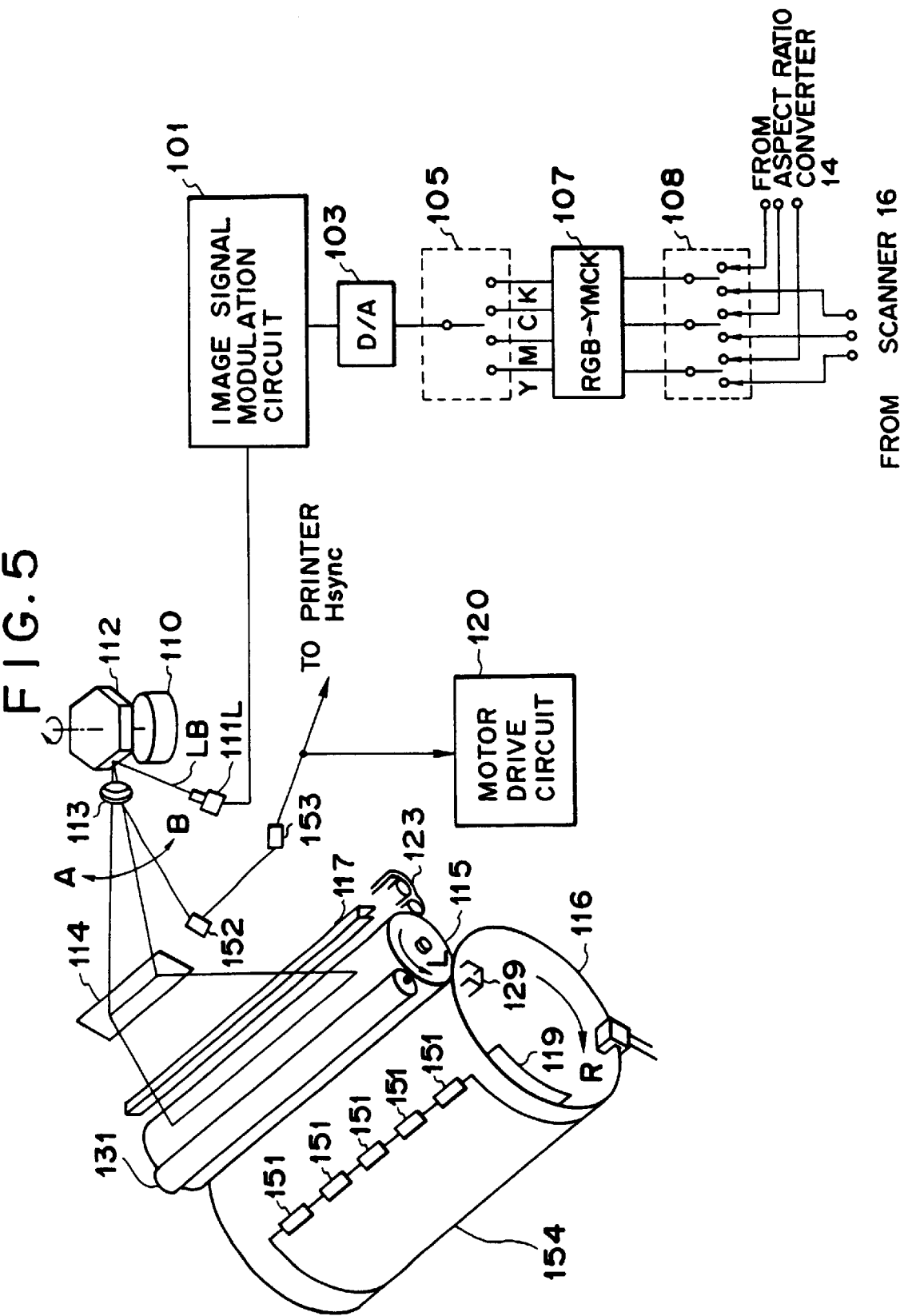
FIG. 5 is a view showing an example of the structure of a printer 18.

In FIG. 5, there are shown a switch circuit 108 for selecting either the image signal from the data amount converter 14 or the image signal from the scanner 16; a converter circuit 107 for converting the input signals R, G, B into signals Y, M, C and K; a selector switch 105 for selecting one of the Y, M, C and K signals from the converter circuit 107 for supply to a D/A converter 103; and an image signal modulating circuit 101 for applying pulse width modulation to the output signal of the D/A converter 103.

The printer of the present embodiment comprises a laser beam printer for color printing using a frame sequential method. A laser beam LB modulated by the modulation circuit 101 corresponding to the image data is put into a high-speed horizontal scanning motion, as indicated by an arrow A-B, by a polygon mirror 112 rotated at a high speed by a motor 110, and is focused on the surface of a photosensitive drum 115 through an f-Θ lens 113 and a mirror 114, thereby giving dot exposures corresponding to the image data. A horizontal scanning motion of the laser beam corresponds to a horizontal scan of the original image, and to a width of 1/16 mm in the sub-scanning direction in the present embodiment.

As the photosensitive drum 115 is rotated at a constant speed in a direction L, the laser beam scans the drum in the main scanning direction by the above-explained scanning motion of the beam and in the sub-scanning direction by the rotation of the drum, thereby exposing the drum in succession and forming a two-dimensional latent image. The exposure is preceded by uniform charging with a charger 117 and succeeded by image developed with a developing sleeve 131 to obtain a visible toner image. For example, corresponding to the first scanning operation of a color image reader, the image.development is conducted with yellow toner of a developing sleeve 131 to obtain, on the photosensitive drum 115, a toner image corresponding to the yellow component of the video signal entered through the switch 108.

Then the yellow toner image is transferred onto a sheet 154, wound on a transfer drum 116 and gripped at the front end by a gripper 151, by means of a transfer charger 129 provided at the nip between the photosensitive drum 115 and the transfer drum 116. The above-explained process is repeated for the images of magenta (M), cyan (C) and black (K), and the toner images are superposed on said sheet 154 to complete a full-color image with toners of four colors.

Subsequently the transfer sheet 154 is separated from the transfer drum 116 by an movable separating finger (not shown), and guided by a conveyor belt (not shown) to an image fixing unit (not shown), in which the toner image on the sheet 154 is fixed by fusion with heated pressure rollers (not shown) in the image fixing unit.

In FIG. 5 there are also shown a photosensor 152 for detecting the timing of scanning of the laser beam LB, and a signal processing circuit 153 for shaping the output signal of the photosensor 152. During the operation of the printer, the output signal of the signal processing circuit 153 is released as the Hsync signal. A motor drive circuit 120 drives the motor 110, based on the output of the signal processing circuit 153.

In the above-explained embodiment, the conversion of the aspect ratio is achieved by a data amount converter, but there may also be employed other methods for this purpose.

For example the present invention also includes a method of storing the digital image signal once in a frame memory, and, when supplying the signal to the printer, varying the printing speed of the printer in such a manner as to obtain the proper aspect ratio (1:1 in the present embodiment).

Such a variation in the printing speed can be achieved in various manners, according to the kind of printer. In the case of a laser beam printer, the aforementioned motor drive circuit 120 may be so controlled as to increase the rotating speed of the polygon mirror 112 reflecting the laser beam. In the case of a thermal printer, the sheet feeding speed may be decreased.

The conversion of the aspect ratio may be varied by suitably changing, at the conversion of the data amount of the image signal, the reading speed of the scanner.

Figure 10:
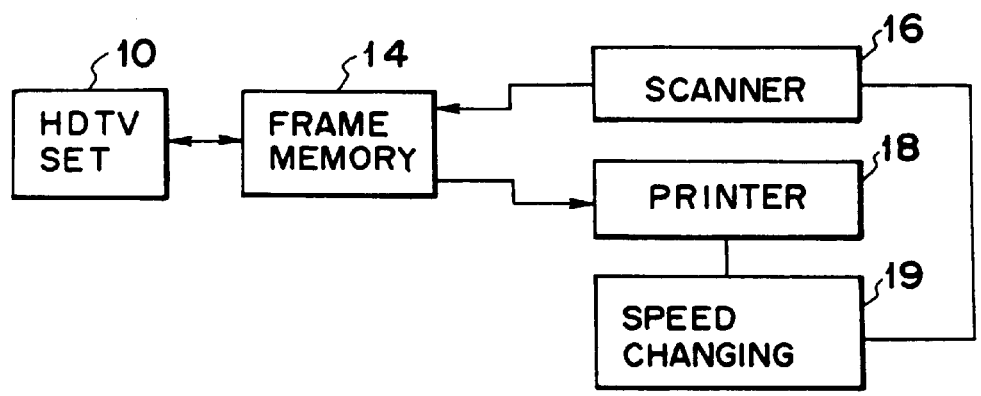
FIG. 10 is a block diagram of a third embodiment of the present invention.

FIG. 10 shows an embodiment employing such a method, wherein same components as those in FIG. 1 are represented by the same numbers and will not be explained further.

In FIG. 10 there are provided a scanner 16 with a variable reading speed and a printer 18 with a variable printing speed.

Figure 11:
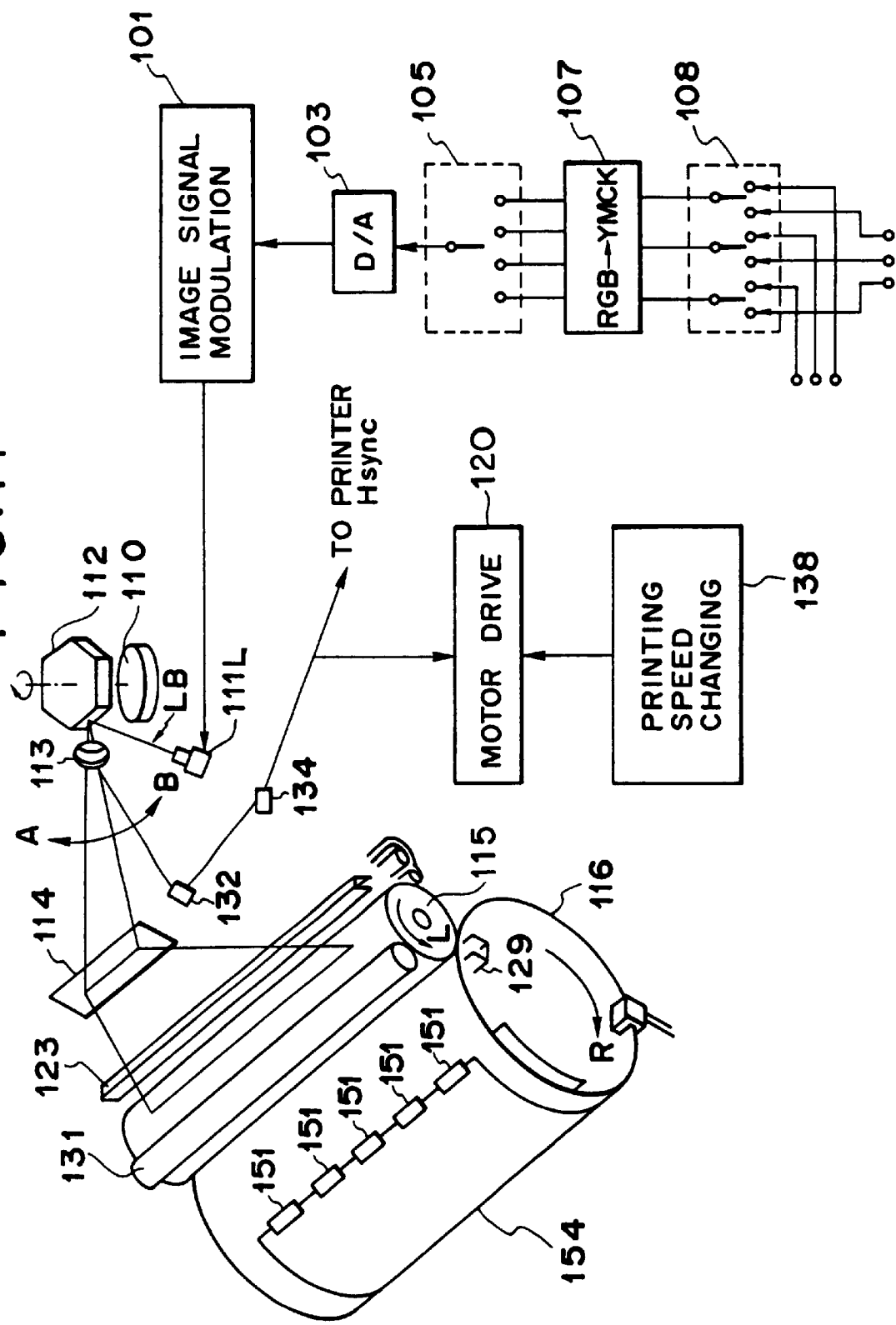
FIG. 11 is a view showing a printer of a structure different from that shown in FIG. 5.

FIG. 11 shows the structure of the printer 18 shown in FIG. 10. The printer is provided with a printing speed changing circuit 138, in addition to the components shown in FIG. 5.

The motor drive circuit 120 in FIG. 11 rotates the motor 110 with a revolution speed corresponding to the frequency of a timing signal from a printing speed changing circuit 138. Thus the circuit 138 controls the revolution of the motor 110 by the frequency of the timing signal supplied from the circuit 138 to the motor drive circuit 120, thereby controlling the revolution of the polygon mirror 112.

Figure 12:
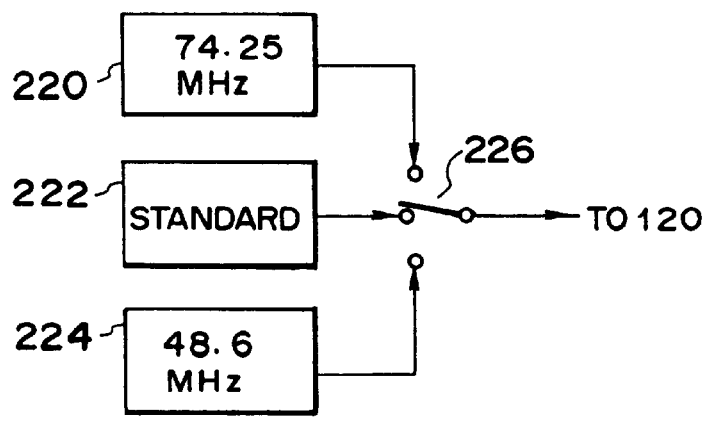
FIGS. 12 and 13 are block diagrams showing examples of the structure of a printing speed changing circuit shown in FIG. 11.

FIG. 12 shows an example of the circuit structure of the printing speed changing circuit 138, wherein oscillators 220, 222, 224 of respectively different oscillation frequencies are provided, and a switch 226 for selecting one of the output clock signals of the oscillators 220, 222, 224 for supply to the motor drive circuit 120. For example the oscillator 222 oscillates with a standard frequency; the oscillator 220 oscillates with a higher frequency of 74.25 MHz for correcting the vertically oblong pixel shape; and the oscillator 224 oscillates with a lower frequency of 48.6 MHz for correcting the horizontally oblong pixel shape. One of the outputs of the oscillators 220, 222, 224 is selected according to the sampling rate of the image signal to be printed. In this manner the printer 18 can be operated with a printing speed corresponding to the sampling rate, thereby obtaining the printed image of an aspect ratio the same as that of the original image.

Figure 13:
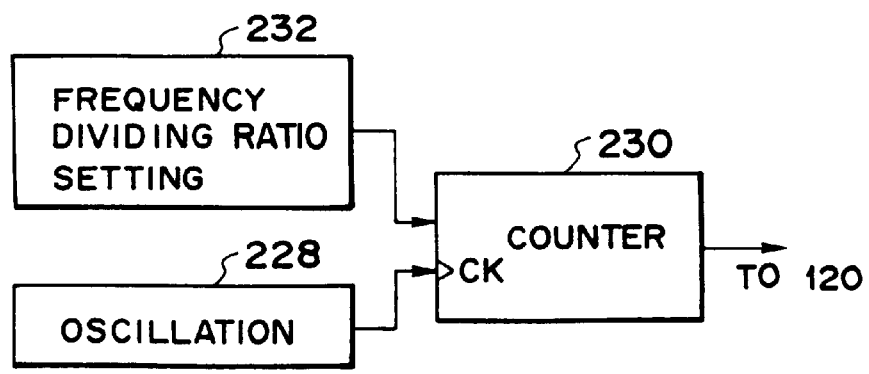

FIG. 13 shows another example of the printing speed changing circuit 138, wherein a crystal oscillator 228 of a constant frequency, a programmable counter 230, and a frequency division ratio setting circuit 232 for determining the frequency dividing ratio in the programmable counter 230 are provided. The circuit 232 releases a frequency dividing ratio signal, according to the sampling rate of the image to be printed, for obtaining a revolution of the polygon mirror 112 provide the proper aspect ratio in the printed image. The counter 230 divides the frequency of the clock signal from the oscillator 228 with the ratio instructed by the ratio setting circuit 232 and sends the frequency divided clock signal to the motor drive circuit 120. The frequency division ratio setting circuit 232 may be so designed as to selectively release one of a plurality of frequency dividing data corresponding to a standard sampling frequency, a higher sampling frequency 74.25 MHz and a lower sampling frequency 48.6 MHz, or to release arbitrarily variable frequency dividing data.

Figure 14:
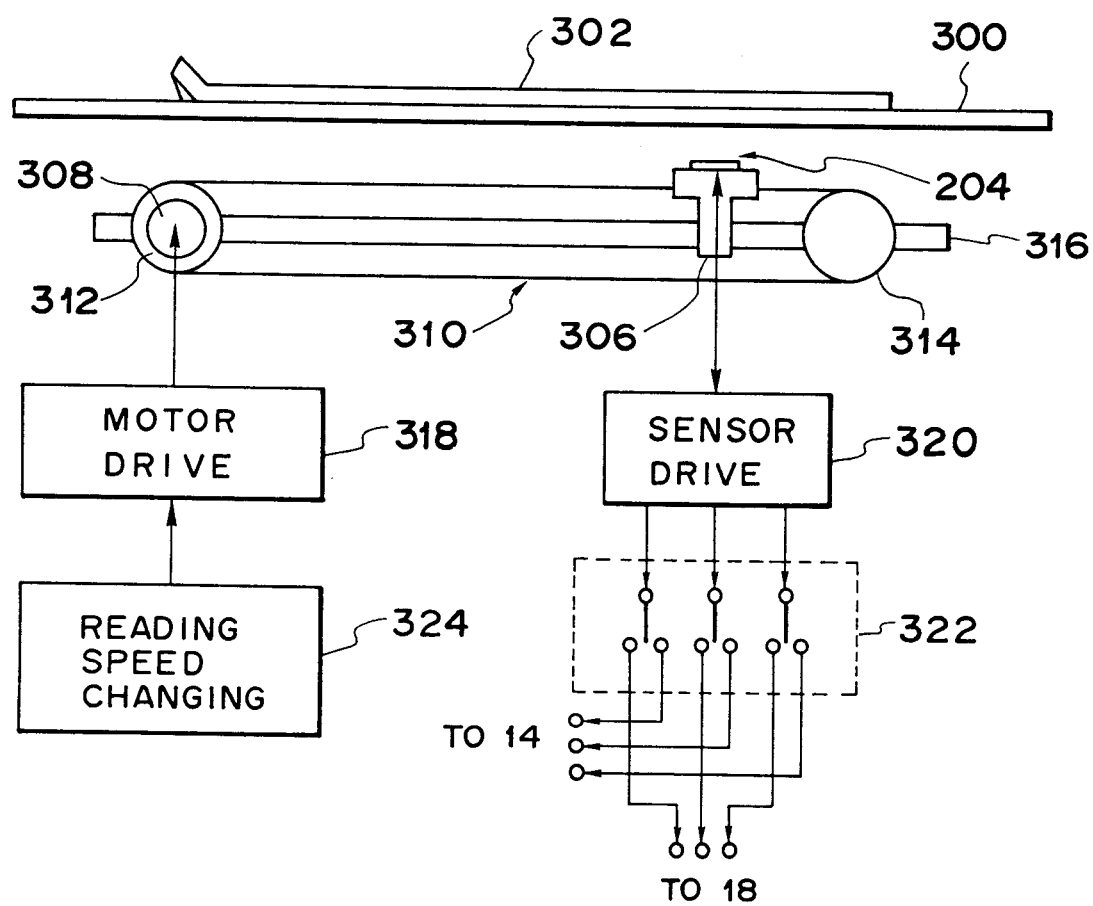
FIG. 14 is a view showing the details of a scanner shown in FIG. 10.

FIG. 14 is a schematic view of the internal structure of the scanner 16, wherein shown are a platen glass 300 for supporting the original image; an original 302 to be read; a color line sensor 204 for reading the original 302; a carriage 306 supporting the line sensor 204; a motor 308 for moving the carriage 306 by means of a wire 310; pulleys 312, 314 for guiding the wire 310; a guide rail 316 for the carriage 306; a motor drive circuit 318 for driving the motor 308; a line sensor drive circuit 320 for driving the line sensor 204 and outputting three primary color signals of red, green and blue obtained from the output of the line sensor 204; a switch 322 for selecting the printer 18 or the data amount converter 14 as the destination of the data; and a reading speed changing circuit 324, included in the speed changing circuit 19 (see FIG. 10), for supplying the motor drive circuit 318 with a timing signal. The reading speed changing circuit 324 is basically similar to that shown in FIGS. 12 and 13.

The motor drive circuit 318 rotates the motor 308 with a revolution speed corresponding to the frequency of the signal from the reading speed changing circuit 324, whereby the sensor drive circuit 320 can provide an image signal of an aspect ratio matching that of the image signal of the frame memory 12 or the printer 18.

In the above-explained embodiment, the printing speed is changed by controlling the rotating speed of the polygon mirror 112, but it is also possible to maintain the polygon mirror 112 at a constant revolution speed and to vary the revolution speed of the drums 115 and 116.

Also the foregoing description has been limited to an electrophotographic printer employing the polygon mirror 112, but the present invention is likewise applicable to other printers such as a thermal printer or an ink jet printer. In which case the moving speed of the recording head is controlled because the recording density of the head is physically fixed.

In the foregoing embodiments shown in FIGS. 1 and 5, the conversion of the aspect ratio is conducted on the digital input image signal. However, the conversion of the aspect ratio may likewise be achieved by changing the timing of sampling for A/D conversion of the high definition video signal entered in analog form.

Figure 6:
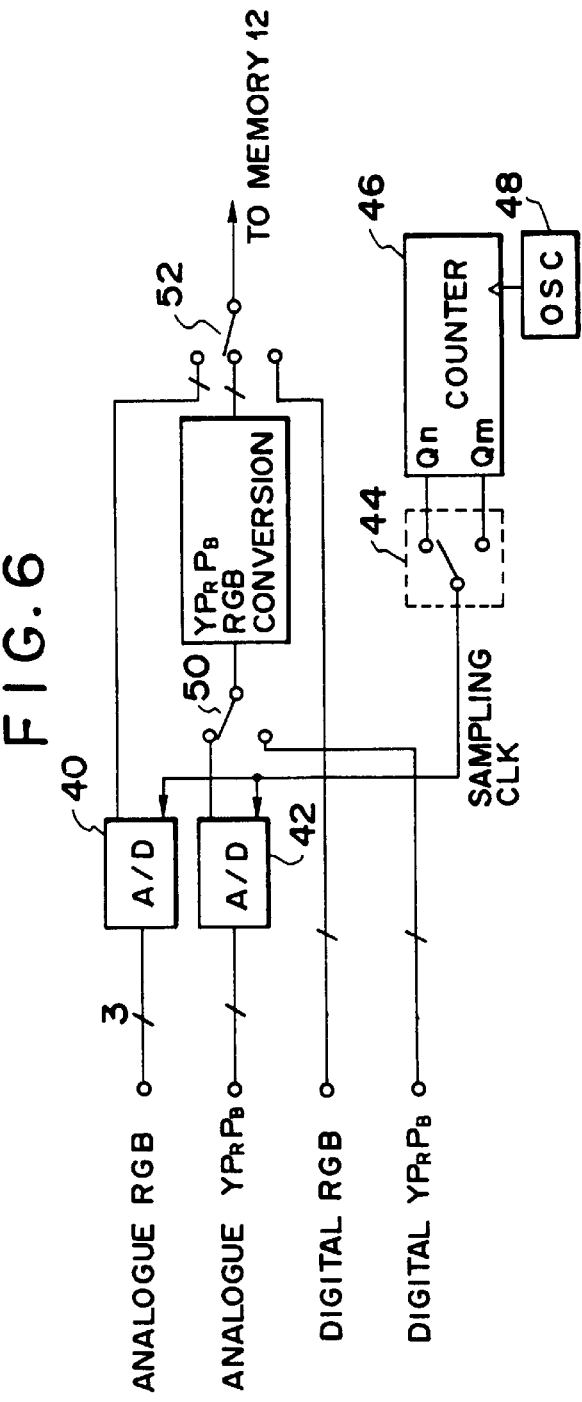
FIG. 6 is a block diagram of a second embodiment of the present invention.

Such embodiment is shown in FIG. 6.

In FIG. 6, there are provided A/D converters 40, 42 for converting input analog signals R, G, B and $YP_RP_B$ into digital signals, according to A/D conversion timing pulses entered through a switch 44; a counter 46 for dividing the frequency of the output signal from an oscillator 48 with such dividing ratios as to generate a sampling frequency corresponding to the BTA standard from a terminal Qn and a frequency matching the printer from a terminal Qm; a selector switch 50 for selecting the Y, $P_R$, $P_B$ signals entered from two sources; and a selector switch 52 for selecting the R, G, B signals entered from two sources.

In the circuit shown in FIG. 6, the switch 44 is placed at Qm for printing the input video signal in the printer 18, or at Qn otherwise.

The above-explained control allows the apparatus to satisfactorily respond to two signal processing systems of different aspect ratios.

In the foregoing embodiments, the data amount conversion is achieved by pixel skipping or interpolation, but a similar effect can also be obtained by calculation. There will be considered a case in which the sampling frequency $f_Q$ before data amount conversion and the sampling frequency $f_p$ after conversion are related as follows:

$$f_Q : f_p = 3:4$$

According to Shannon's sampling principle, the original signal can be restored from the sampled data as follows:

$$g(t) = \Sigma g(iT) S(t-iT)$$

wherein i is zero or a positive integer, T is $1/f_Q$, and S is the sampling frequency.

Conversion of sample values $Q_0, Q_1, Q_2, \ldots$ obtained at the sampling frequency $f_Q$ into sample values $P_0, P_1, P_2, \ldots$ with the sampling frequency $f_p$ can be achieved by substituting g(t), obtained by substituting g(0), g(1), g(2), ... with $Q_0, Q_1, Q_2, \ldots$ in the right-hand term of the foregoing equation, with the times t of $P_0, P_1, P_2, \ldots$. Stated differently, this conversion is to interpolate $P_i$ with the minimum common multiple $4f_Q$ (=$3f_p$) of $f_Q$ and $f_p$, and to effect re-sampling with the frequency $f_p$ to obtain $Q_j$. More specifically;

$$P_{4k} = \Sigma_m S_{4m} \cdot Q_{3k+m}$$

$$P_{4k+1} = \Sigma_m S_{4m-3} \cdot Q_{3k+m}$$

$$P_{4k+2} = \Sigma_m S_{4m-6} \cdot Q_{3k+m}$$

$$P_{4k+3} = \Sigma_m S_{4m-9} \cdot Q_{3k+m}$$

wherein $\Sigma_m$ is the summation from $-\infty$ to $+\infty$. Though such summation is not realizable in practice, it can be approximated utilizing a random access memory or a digital signal processing IC.

In the foregoing description, the nature of the video signal is not specified. In fact the video signal may be three primary color signals of red, green and blue, a luminance signal and color difference signals, or a composite signal. In the foregoing embodiments, the image after data amount conversion contains several discontinuous portions, but such discontinuity can be eliminated by applying a smoothing filtration afterwards. Also the interpolation is not limited to simple interpolation but can be linear interpolation or cubic interpolation.

As will be easily understood from the foregoing description, the present invention allows reading or printing of images of different sampling rates while maintaining the original aspect ratio of the image.

The foregoing embodiments have been limited to signal processing between an HD equipment and a scanner/printer, but the present invention is applicable not only to the high definition television signals but also to other various video signals.

As explained in the foregoing, the embodiments of the present invention prevent image distortion caused by a change in the aspect ratio due to signal processing.

What is claimed is:

1. An image processing apparatus for outputting an image signal to an image output apparatus, the image output apparatus corresponding to a first pixel aspect ratio, said image processing apparatus comprising:

input means having the capability of inputting a plurality of kinds of image signals whose pixel aspect ratios are different from each other, the pixel aspect ratios of the plurality of kinds of image signals being different from the first pixel aspect ratio; and conversion means for converting an input image signal input by said input means into a first image signal comprising the first pixel aspect ratio so that an aspect ratio of a picture represented by the input image signal is not changed at said image output apparatus, said conversion means having a plurality of conversion modes which correspond to the plurality of kinds of image signals.

2. Apparatus according to claim 1, further comprising a memory for storing the input image signal.

3. Apparatus according to claim 2, wherein said memory comprises a first-in-first-out memory.

4. Apparatus according to claim 2, wherein said conversion means converts the input image signal by skipping a portion of the input image signal written into said memory.

5. Apparatus according to claim 2, wherein said conversion means converts the first image by skipping a portion of the input image signal read from said memory.

6. Apparatus according to claim 2, wherein said conversion means includes a memory for storing the input image signal input by said input means, and converts the input image signal to the first image signal by varying one of (i) the writing of the input image signal into said memory, and (ii) the reading of the first image signal from said memory.

7. Apparatus according to claim 2, wherein said conversion means includes a memory for storing the input image signal and converts the input image signal to the first image signal by altering sampling frequencies of the input image signal being written into or read from said memory.

8. Apparatus according to claim 1, wherein the pixel aspect ratio of the input image signal is determined according to the Broadcasting Technology Development Association standards.

9. Apparatus according to claim 1, wherein said input means includes a scanner for outputting the input image signal.

10. Apparatus according to claim 1, wherein said input means includes a video camera for outputting the input image signal.

11. Apparatus according to claim 1, wherein said image processing apparatus comprises an image output apparatus.

12. Apparatus according to claim 11, wherein said image output apparatus comprises a television.

13. Apparatus according to claim 11, wherein said image output apparatus comprises a printer.

14. Apparatus according to claim 11, wherein said image output apparatus comprises a video tape recorder.

15. An image processing apparatus for outputting to an image apparatus, the image output apparatus corresponding to a first pixel aspect ratio, said apparatus comprising:

input means having the capability of inputting a plurality of kinds of image signals whose pixel aspect ratios are different from each other, the pixel aspect ratios of the plurality of kinds of image signals being different from the first pixel aspect ratio;

printing means for printing the image on the basis of the input image signal input by said input means; and control means for controlling a printing speed of said printing means, said control means controlling the printing speed so that an aspect ratio of a picture represented by the input image signal is not changed in the image output by said printing means, said control means having a plurality of control modes which correspond to the plurality of kinds of image signals.

16. Apparatus according to claim 15, wherein said printing means effects image formation by scanning an image bearing member with radiation, and wherein said control means controls a speed of scanning of said image bearing member.

17. Apparatus according to claim 16, wherein said printing means comprises an electrophotographic printer.

18. Apparatus according to claim 17, wherein said electrophotographic printer comprises a laser beam printer.

19. Apparatus according to claim 15, wherein said input means includes a video camera for outputting the input image signal.

20. Apparatus according to claim 15, wherein said input means includes a video tape recorder for outputting the input image signal.

21. An image processing apparatus for outputting an image signal to a plurality of image output apparatuses, said plurality of image output apparatuses corresponding to different pixel aspect ratios, respectively, said image processing apparatus comprising:

scanner means for forming an input image signal by reading an original image; and conversion means for converting the input image signal to an image signal of the pixel aspect ratio corresponding to the image output apparatus which outputs the image signal; and said conversion means including control means for controlling a reading speed of said scanner means to convert the pixel aspect ratio of the input image signal, said control means controlling the reading speed so that an aspect ratio of a picture represented by the input image signal is not changed at the image output apparatus, said conversion means having a plurality of conversion modes which correspond to said plurality of image output apparatuses.

22. Apparatus according to claim 21, wherein said image processing apparatus includes said image output apparatus.

23. Apparatus according to claim 22, wherein said image output apparatus comprises a television.

24. Apparatus according to claim 22, wherein said image output apparatus comprises a video tape recorder.

25. An image processing method of outputting an image signal to an image output apparatus, the image output apparatus corresponding to a first pixel aspect ratio, said image processing method comprising the steps of:

an input step having the capability of inputting a plurality of kinds of image signals whose pixel aspect ratios are different from each other, the pixel aspect ratios of the plurality of kinds of image signals being different from the first pixel aspect ratio; and a conversion step of converting the input image signal input in said input step into a first image signal comprising the first pixel aspect ratio so that an aspect ratio of a picture represented by the input image signal is not changed at said image output apparatus, said conversion step having a plurality of conversion modes which correspond to said plurality of kinds of image signals.

26. An image output processing method of outputting to an image output apparatus, the image output apparatus corresponding to a first pixel aspect ratio, said method comprising the steps of:

an input step of having the capability of inputting a plurality of kinds of image signals whose pixel aspect ratios are different from each other, the pixel aspect ratios of the plurality of kinds of image signals being different from the first pixel aspect ratio;

a printing step of printing the image on the basis of the input image signal input by said input step; and a control step of controlling a printing speed of said printing step, said control step including a step of controlling the printing speed so that an aspect ratio of a picture represented by the input image signal is not changed in the image output by said printing step, said control step having a Plurality of control modes which correspond to said plurality of kinds of image signals.

27. An image processing method of outputting an image signal to a plurality of image output apparatuses, said plurality of image output apparatuses corresponding to different pixel aspect ratios, respectively, said image processing method comprising the steps of:

a forming step of forming an input image signal by reading an original image; and a conversion step of converting the input image signal to an image signal of the pixel aspect ratio corresponding to the image output apparatus which outputs the input image signal, said conversion step including a control step of controlling a reading speed of said forming step to convert the pixel aspect ratio of the input image signal, said control step including the step of controlling the reading speed so that an aspect ratio of a picture represented by the input image signal is not changed at the image output apparatus, said conversion step having a plurality of conversion modes which correspond to said plurality of image output apparatuses.

28. An image processing apparatus for outputting an image signal to a plurality of image output apparatuses, said plurality of image output apparatuses corresponding to different pixel aspect ratios, respectively, said image processing apparatus comprising:

input means for inputting an image signal; and conversion means for converting the input image signal into an image signal of the pixel aspect ratio corresponding to the image output apparatus which outputs be input image signal, said conversion means converting the input image signal so that an aspect ratio of a picture represented by the input image signal is not changed at said image output apparatus, and said conversion means having a plurality of conversion modes which correspond to said plurality of output apparatuses.

29. Apparatus according to claims 28, wherein said image output apparatus comprises a television.

30. Apparatus according to claims 28, wherein said image output apparatus comprises a video tape recorder.

31. An image processing method of outputting an image signal to a plurality of image output apparatuses, said plurality of image output apparatuses corresponding to different pixel aspect ratios, respectively, said image processing method comprising the steps of:

an input step of inputting an image signal; and a conversion step of converting the input image signal into an image signal of the pixel aspect ratio corresponding to the image output apparatus which outputs the input image signal, said conversion step including a step of converting the input image signal so that an aspect ratio of a picture represented by the input image signal is not changed at said image output apparatus, and said conversion step having a plurality of conversion modes which correspond to said plurality of image output apparatuses.

* * * * *

UNITED STATES PATENT AND TRADEMARK OFFICE
CERTIFICATE OF CORRECTION

PATENT NO.    : 6,275,306 B1
DATED         : August 14, 2001
INVENTOR(S)   : Masafumi Wataya et al.

It is certified that error appears in the above-identified patent and that said Letters Patent is hereby corrected as shown below:

<u>Title page,</u>
Item [56] References Cited, FOREIGN PATENT DOCUMENTS,
"2543771  10/1984  (FR)." should be deleted.

<u>Column 2,</u>
Line 65, "an" should read -- a --.

<u>Column 5,</u>
Line 30, "an" should read -- a --.

<u>Column 6,</u>
Line 37, "112" should read -- 112 to --.

<u>Column 9,</u>
Line 27, "image apparatus," should read -- image output apparatus, --.

<u>Column 10,</u>
Line 49, "Plurality" should read -- plurality --.

<u>Column 11,</u>
Line 15, "be" should read -- the --.

<u>Column 12,</u>
Line 1, "claims 28," should read -- claim 28, --; and
Line 3, "claims 28," should read -- claim 28, --.

Signed and Sealed this

Ninth Day of April, 2002

*Attest:*

*Attesting Officer*

JAMES E. ROGAN
*Director of the United States Patent and Trademark Office*